United States Patent [19]

Pickles

[11] 4,071,847
[45] Jan. 31, 1978

[54] RADIO NAVIGATION ANTENNA SYSTEM

[75] Inventor: Sidney Pickles, Colusa, Calif.

[73] Assignee: E-Systems, Inc., Dallas, Tex.

[21] Appl. No.: 665,619

[22] Filed: Mar. 10, 1976

[51] Int. Cl.² ............................................. H01Q 3/12
[52] U.S. Cl. ................................ 343/761; 343/106 R; 343/846
[58] Field of Search .................. 343/106 R, 766, 833, 343/837, 839, 846, 761

[56] References Cited

U.S. PATENT DOCUMENTS

| | | | |
|---|---|---|---|
| 3,051,951 | 8/1962 | Lucanera | 343/773 |
| 3,141,169 | 7/1964 | Bellis et al. | 343/833 |
| 3,935,576 | 1/1976 | Pickles | 343/761 |

*Primary Examiner*—Eli Lieberman
*Attorney, Agent, or Firm*—Robert V. Wilder

[57] ABSTRACT

Tactical radio navigation systems provide bearing information to an interrogating aircraft in response to pairs of interrogation pulses received at a beacon transponder, such systems also provide distance measuring and identification information. To provide the required bearing information, pulses radiated from a central antenna array are modulated at a 15 Hz frequency and by a 135 Hz frequency, by reflector elements rotating around a stationary central radiator. A counterpoise system associated with the central radiator and the reflector elements uptilts the carrier frequency and the 15 Hz modulation. To provide more uptilt to the radiated signal and further decrease the total energy radiated below the horizon, a double circuit shield counterpoise is provided in the lower part of a radome assembly enclosing the antenna system.

16 Claims, 9 Drawing Figures

RADIO NAVIGATION ANTENNA SYSTEM

This invention relates to a radio navigation antenna system and more particularly to a radio navigation system with improved radiation energy uptilt above a horizontal reference.

Heretofore, omnidirectional beacon systems required the use of a high power beacon transmitter to generate interrogating transmission at sufficient power and vertical elevation to provide directional accuracy to enable the interrogating aircraft to obtain a position fix. Such high power transmitters are difficult to construct and maintain to reliably provide the requisite multilobed rotating direct radiation pattern. Considering that many such systems are designed for portability, this further increases the complexity of the source of transmitted energy.

In beacon systems of this type, it is desirable to have an antenna system that provides a vertical radiation pattern which gives good coverage at angles above the horizon while having low radiation below the horizon to minimize reflected energy to an interrogating aircraft. This reflected energy is commonly identified as site errors. It has been found difficult to obtain sufficient modulation at the higher vertical radiation angles, while maintaining satisfactory operation at low vertical angles over a desired frequency range.

Various arrangements have been used to obtain the desired pattern uptilt while minimizing the below horizon reflection. One such arrangement uses a central radiator comprising a vertical stack of elements such as cones. Since this arrangement adds considerable height to the system it is considered unsatisfactory for the portable systems now proposed.

A feature of the present invention is to provide a radio navigation antenna system having a vertical radiation pattern of sufficient power to enable an interrogating aircraft to obtain a position fix. Further, a feature of the present invention is to provide an antenna system having an uptilted energy pattern with a minimum of radiation loss below the horizon. Still another feature of the present invention is to provide an antenna system having counterpoise elements to improve directivity of transmitted energy.

In a system where the present invention is embodied, radio frequency energy is fed to a stationary central radiator. This central radiator has no directivity in the horizontal plane and low modulation frequency reflector elements are rotated around the central radiator at a fixed number of revolutions per second. The distance between the central radiator and the reflector elements is established to obtain a desired cardioid radiation pattern. For improved accuracy, a group of additional high frequency radiator elements, mounted a fixed number of degrees apart, also rotate around the central radiator along with the low frequency reflector elements.

In accordance with the present invention, an antenna system for radiating energy above the horizon and energized from a radio frequency source includes a central radiator coupled to the radio frequency source. A first plurality of spaced, reflector elements are radially positioned from the central radiator and a second plurality of spaced, reflector elements are positioned between the central radiator and the first plurality of reflector elements. In addition, the antenna system includes a first reflecting surface axially disposed from the first plurality of reflector elements and a second reflecting surface axially positioned between the first reflecting surface and the first plurality of reflecting elements. The second surface is coupled to the first surface as a counterpoise for reflecting an upward radiation pattern from the antenna system.

A more complete understanding of the invention and its advantages will be apparent from the specification and claims and from the accompanying drawings illustrative of the invention.

Referring to the drawings.

Figure 1:
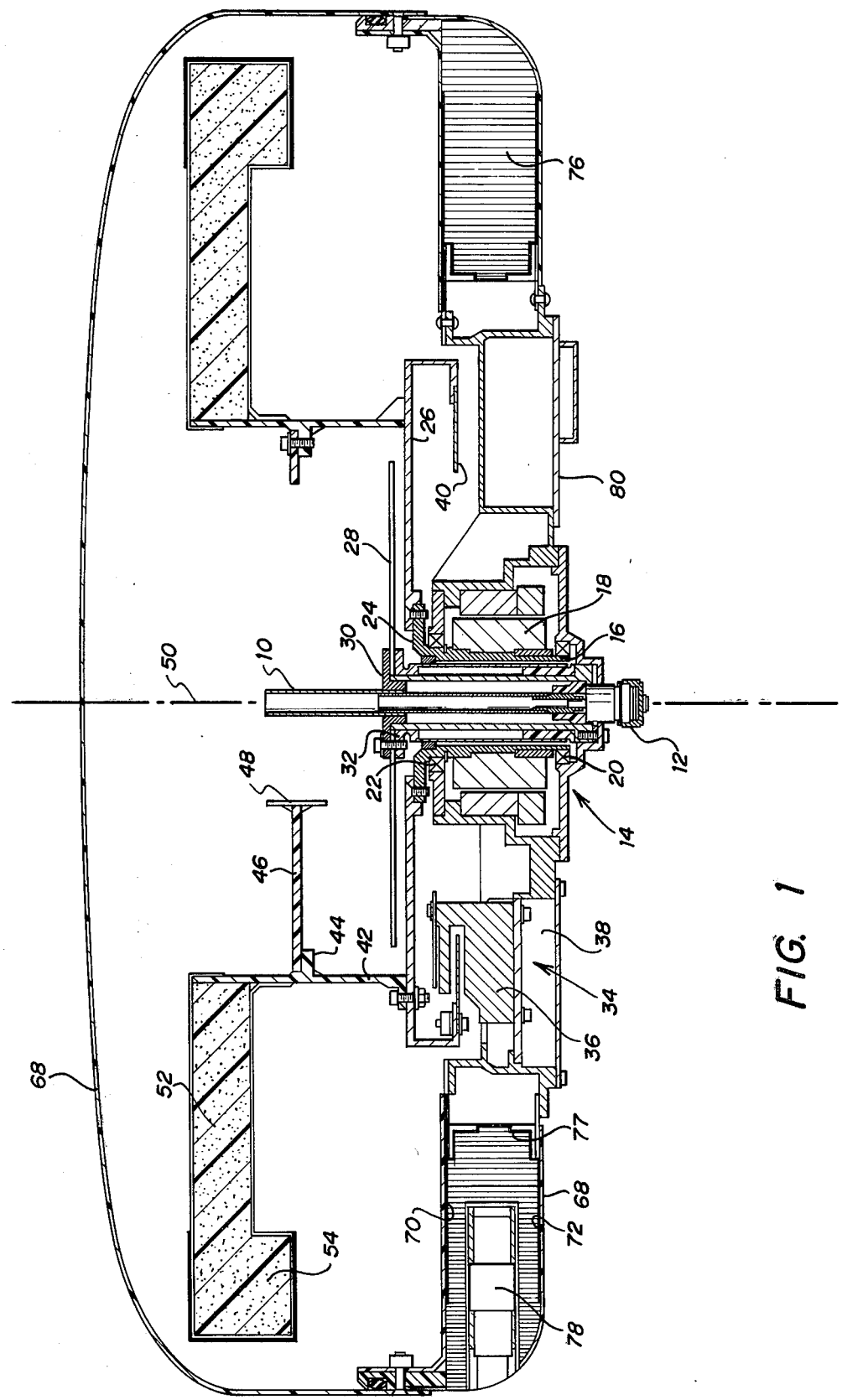
FIG. 1 is a cross section of a high band radio navigation antenna including a central radiator couterpoise and a double circular shield counterpoise.

Referring to FIG. 1, there is shown an antenna of a navigation system wherein a central radiator 10 is excited by energy applied to a main transmission line from a radio frequency source and coupled to the central radiator through a connector 12. The main transmission line feeds the central radiator 10 through a hollow shaft drive motor 14 as described in U.S. Pat. No. 3,790,943 to Sidney Pickles. A hollow shaft 16 of the motor 14 rotates with the motor rotor 18 on bearings 20 and 22.

Figure 5:
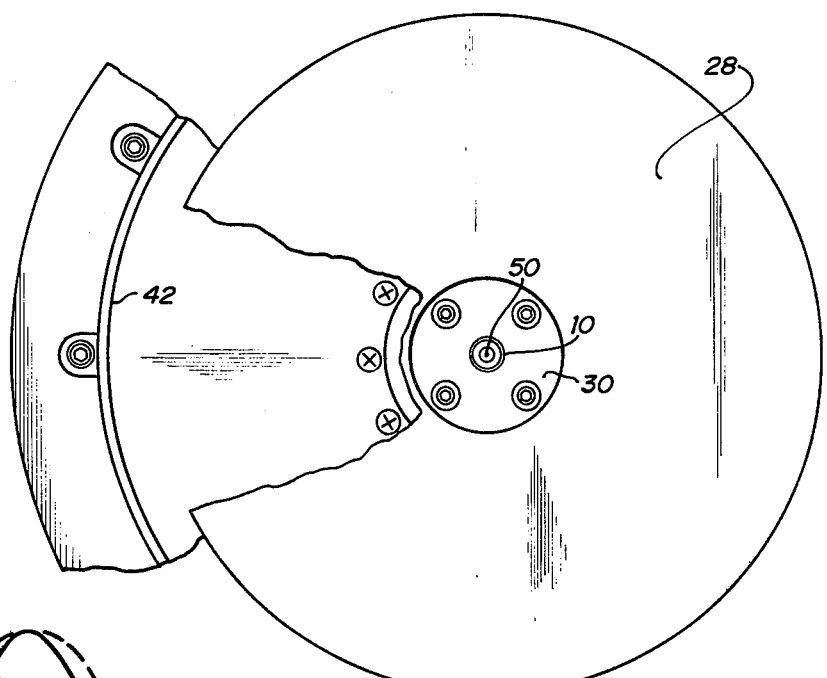
FIG. 5 is a top view, partially cut away, of the central radiator counterpoise.

Referring to FIGS. 1 and 5, radially extending from the shaft 16 is a mounting flange 24 to which is attached a reflecting surface and disc support 26 as one element of a counterpoise for the central radiator 10. The second element of the central radiator counterpoise is a metallic disc, reflecting surface 28 secured by means of a nonmetallic bushing 30 to a stationary choke skirt 32. The central radiator counterpoise including the reflecting surfaces 26 and 28 shields the carrier frequency of the central radiator 10 and the 15 Hz frequency signal from reflecting into the motor bearings as well as being affected by the reference trigger generator 34 and the frame assembly for the motor 14. In addition to the counterpoise, the choke skirt 32 extends into the motor shaft 16 to further reflect energy from the central radiator 10. The counterpoise system comprising the reflecting surfaces 26 and 28 are associated with the central radiator 10 thereby giving uptilt of the carrier frequency and the 15 Hz frequency modulation.

The reference trigger generator 34 includes a sensor assembly 36 and an amplifier circuit 38 along with a rotating light interrupting disc 40. The light interrupting disc 40 contains accurately located open slots through which the light from three light emitting diodes of the sensor assembly 36 passes momentarily to photosensitive transistors to cause trigger pulses to be generated as the antenna rotates. The light emitting diodes and the photosensitive transistors of the assembly 36 are located on facing surfaces of the U-shaped housing through which the light interrupting disc 40 rotates. A more complete description of the reference trigger generating circuit is given in the U.S. Pat. No. 3,790,943 of Sidney Pickles.

Figure 2:
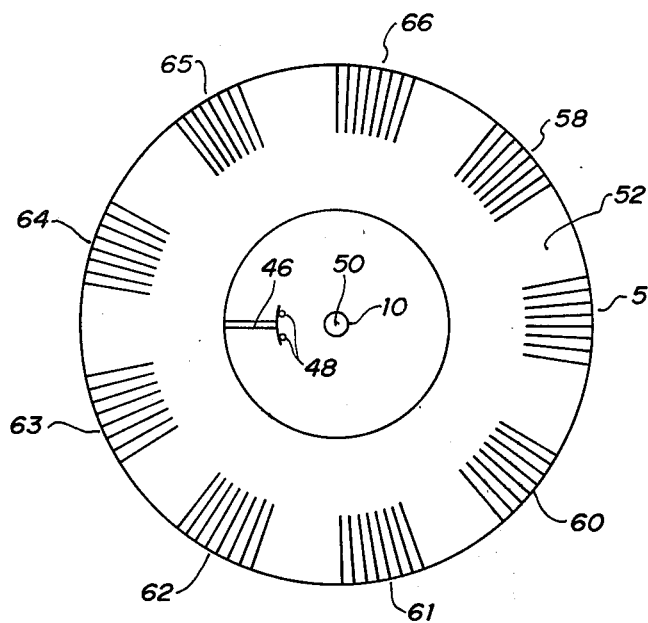
FIG. 2 is a top view of the rotating disc of the antenna of FIG. 1 showing the 15 Hz reflector elements and the 135 Hz reflector elements.

Referring to FIGS. 1 and 2, mounted to the upper surface of the disc support assembly 26 is a fiberglass support tube 42 including a radially inwardly extending flange 44 to which is mounted a fiberglass support arm 46. At the inward end of the T-shaped support arm 46 there is attached two U-shaped reflector elements 48 (only one shown in FIG. 1). The reflector elements 48 are mounted in a plane parallel to the longitudinal axis 50 of the central radiator 10.

Extending radially outward from the support tube 42 is a nonmetallic disc 52 terminating in an annular shaped ring 54, also of a nonmetallic material. Typically, the disc 52 including the annular ring 54 are constructed from a low dielectric insulating material. For the high band of the TACAN frequency range, 1154 to 1215 MHz, the disc 52, including the annular ring 54, has a radius of 10.5 inches with the disc 52 having a one inch cross section and the annular ring 54 having a 1.75 inch cross section.

Referring again to FIG. 2, there is shown a top view of the disc 52 as assembled to the support tube 42 with the reflector elements 48 mounted to the support arm 46. Positioned at the center of the disc 52 is the central radiator 10. The annular ring 54 of the disc 52 supports nine groups 58–66 of high frequency reflector elements. These reflector elements provide high frequency modulation to energy radiated from the central radiator 10. Each group 58–66 of reflector elements includes an array (8 shown as an example) of individual U-shaped elements.

Figure 3:
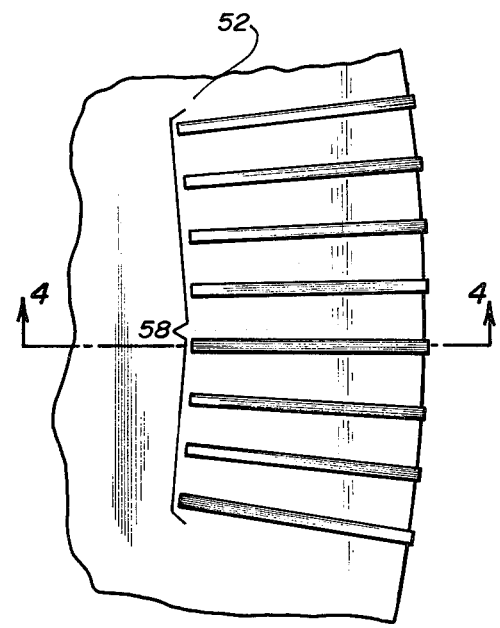
FIG. 3 is an enlarged view of a cutaway portion of the disc of FIG. 2 showing one group of U-shaped 135 Hz reflector elements.
Figure 4:
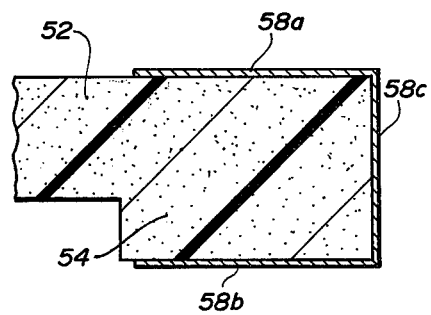
FIG. 4 is a sectional view of a cutaway portion of the disc of FIG. 3 taken along the line 4—4.

Referring to FIGS. 3 and 4, considering the group 58 each element of the group has a configuration as shown in FIG. 4. Each element of the group has an upper section 58a overlaying the upper surface of the disc 52, a lower section 58b overlaying the bottom surface of the disc and an intermediate section 58c joining the upper and lower portions. The upper and lower sections of each of the U-shaped elements are oriented on a radial from the central radiator 10. The intermediate section extends over the outer surface of the annular ring 54 and is parallel to the longitudinal axis 50 of the central radiator 10.

It has been shown that nine groups 58–66 of high frequency reflector elements placed symmetrical about a central radiator 10 will produce a symmetrical nine lobed radiation pattern. This nine lobed radiation pattern is mathematically defined as follows:

$$F(\theta) = 1 + a \sum_{n=0}^{n=4} \cos[d \sin(\theta \pm 40n) + \phi] + ja \sum_{n=0}^{n=4} \sin[d \sin(\theta \pm 40n) + \phi] \quad (1)$$

where, $a$ = an amplitude factor, $\theta$ = horizontal angle about the central radiator 10 and reflector system 58–66.

$\phi$ = the phase of current flowing in each reflector element of the groups 58–66 with reference to an excitation current of the central radiator 10, and $d$ = the distance in radians from the central radiator 10 to a reflector element of the groups 58–66.

The sin and cos functions have been shown to follow the Bessel expansion law.

For a given set of radially displaced reflector elements, the depth of a lobe in the radiation pattern will be a maximum for a given dimension "$d$". When the distance "$d$" is approximately 11 radians optimum conditions of lobiness are achieved. Thus, for a given frequency of excitation of the radiator 10, a reflector element of the groups 58–66 displaced by approximately 11 radians will give an optimum lobed radiation pattern.

Another important parameter of equation (1) is the phase term "$\phi$". Unless this term has a value near ± 90°, a lobed pattern will not form. When the distance between a reflector element of the groups 58–66 and the central radiator 10 is approximately an odd number of quarter wavelengths of the excitation frequency, the excitation of the reflector element produces a current having a phase relative to the phase of the current in the central radiator 10 at 90°, 270°, 450°, etc. or the equivalent of ± 90°.

The problem with radio navigation systems has been to develop an antenna that would operate over the assigned frequency range of 960 MHz to 1215 MHz while maintaining uniform radiation characteristics. If the dimension "$d$" in equation (1) for reflector elements of the groups 58–66 is set at a value of 11 radians at 960 MHz, the effective value of the dimension "$d$" at 1213 MHz is:

$$11 \times 1213 \text{ MHz}/960 \text{ MHz} = 13.90.$$

As the dimension "$d$" changes from 11 radians to 13.90 radians the lobiness continuously decreases to zero and then reverses to increase in an opposite phase. This effect, of course, is in addition to the phase term $\phi$ for current flowing in a reflector element. Since at 13.90 radians the $\phi$ term is less than optimum, the lobed radiation patten deteriorates still further.

If an optimum dimension for "$d$" established at 1213 MHz, then for 960 MHz the effective value for the dimension "$d$" is 8.71 radians. The phase term $\phi$ goes out of operable limits under these conditions and the antenna ceases to function. However, if the reflector elements are frequency responsive there will occur a rejection of excitation when an element is not in the optimum environment and will operate only when a particular frequency of excitation is applied to the central radiator 10.

For additional description of the operation and design of the elements of the groups 58–66, reference is made to the U.S. application Ser. No. 476,042 of Sidney Pickles, filed June 3, 1974 for a Broadband Antenna System, now U.S. Pat. No. 3,935,576 and assigned to the assignee of the present invention. As described therein, the phase angle of the radiating wave from the central radiator 10 is either plus or minus 90 electrical degrees at the intermediate section of each element. The length of the upper and lower sections is determined by the frequency of the emitted wave having the proper phase displacement. Typically, an antenna having reflector elements as arranged in the groups 58–66 operates in the frequency spectrum of 960 MHz to 1215 MHz. However, utilization of the U-shaped reflector elements with radial orientation results in a minimum diameter for the disc 52 to produce an antenna size for man portability. The multiplicity of the elements produces the required modulation at high vertical radiation angles, while maintaining satisfactory operation at low vertical angles and over a desired frequency range.

The ability of the U-shaped elements of groups 58–66 to produce lobiness (135 Hz modulation) depends on three parameters: (1) the dimension of the intermediate section determines the radiation resistance of the element, which, in turn, largely determines the ability of the element to act as a reflector. The product of a current induced into the element by energy radiated from the central radiator 10 times the radiation resistance of the element determines the disturbance (lobiness) the element produces; and thus (2) the ohmic resistance of the element is another factor which determines current flow. The third parameter (3) is the element reactance, and it is this parameter that has made it possible to reduce the size and man portability of omnidirectional TACAN systems.

As in all omnidirectional antenna systems, a group of 15 Hz reflector elements must be provided. In the antenna system of the present invention, the 15 Hz modulation is provided by the U-shaped reflector elements 48 mounted to the support arm 46.

Again referring to FIG. 1, the 135 Hz reflector elements of the groups 58–66 are disposed above a second counterpoise system in order to give more uptilt to the radiated signals and decrease the total energy radiated below the horizon. This second counterpoise system includes a double circuit shield in the lower part of a radome 68. The counterpoise system in the radome 68 comprises a double circuit shield of a first reflecting surface 70 mounted parallel with a second reflecting surface 72. The reflecting surfaces 70 and 72 are electrically interconnected by a shortened conductive cylinder 74.

Figure 6:
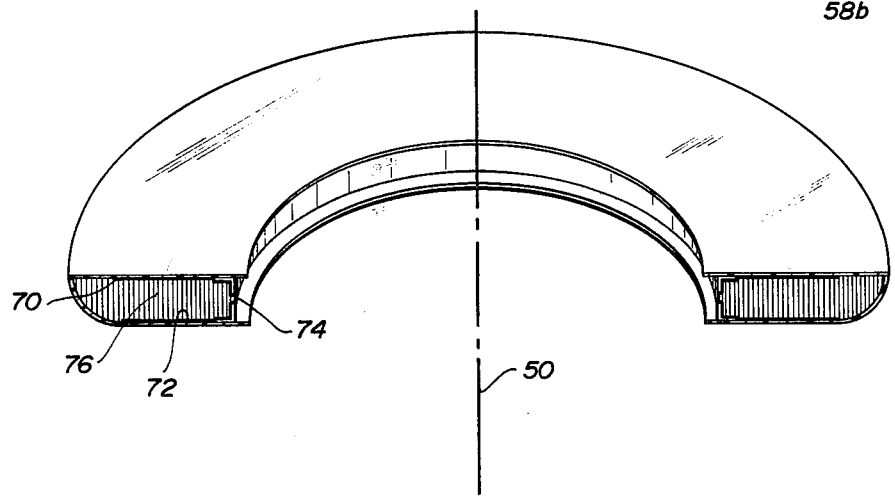
FIG. 6 is a pictorial view in section showing the double circular shield counterpoise.

As shown in FIG. 6, the reflecting surfaces 70 and 72 and the conductive cylinder 74 form a donut-shaped configuration coaxial with the longitudinal axis 50 of the central radiator 10. The upper and lower reflecting surfaces 70 and 72 acting together through the conductive cylinder 74 provide greater uptilt than either alone, as well as preventing considerable energy from being directed below the horizon. The upper surface 70 acts as a reflecting ground plane or counterpoise for energy radiated from the antenna in cooperation with the lower surface 72. The path length of the surfaces 70 and 72 combined with the cylinder 74 approaches 180°. Therefore, what radiates off the outside edge of surface 72 is close to an out of phase condition with what radiates off the outer edge of the surface 70. This condition tends to cancel the radiation to the under side of the antenna system. Thus, radiation from the system that initially travels toward the surfaces 70 and 72 will be reflected in an upward direction. This produces a relative strengthening of the radiation pattern and gives an upward tilt thereto. This reflection of more energy into the higher elevation angles provides proper modulation to a receiving aircraft at elevation angles not heretofore achieved.

The area between the upper surface 70 and the lower surface 72 is filled with a fiberglass honeycomb 76 that extends to the inner wall of the radome 68. At the left end of the antenna structure within the honeycomb 76 is a north compass 78 used to orient the antenna at a site location. The entire antenna and radome assembly is mounted on a main support bracket 80.

As the antenna system is rotated by the motor 14, the reflector elements 48 create a fundamental modulation of the radiation from the central radiator 10. At the same time, the plurality of radiating elements of the groups 58–66 create a harmonic modulation of the radiation from the central radiator 10. The frequency of the fundamental and harmonic modulation is directly a function of the speed of rotation of the motor 14. This produces a carrier radiation pattern which is omnidirectional in the horizontal plane and in the vertical plane has a relatively high strength from the horizon up to a positive vertical angle while having a relatively low strength in angle below the horizon. To further reduce the radiation below the horizon, the central radiator 10 has associated therewith the stationary counterpoise of reflecting surfaces 28, 70 and 72 and a rotating counterpoise system of reflecting surface 26.

Briefly summarizing the operation of the antenna of the present invention, energy at a desired frequency is coupled to the central radiator 10 through the connector 12. A portion of this energy is radiated directly into space from the radiator 10 and another portion is radiated downward and strikes the stationary and rotating counterpoise systems. That portion of the energy from the radiator 10 that strikes the counterpoise systems is then reflected in an upward or tilted manner and recombined with the portion of the directly radiated energy from the radiator 10. This energy, as previously explained, is modulated by the reflector elements 48 and further modulated by the reflector elements of the groups 58–66. Hence, the radiation directly from the central radiator 10 and that reflected from the counterpoise systems is recombined at some distance from the antenna with the modulation imposed thereon having the same and proper phase.

Figure 7A:
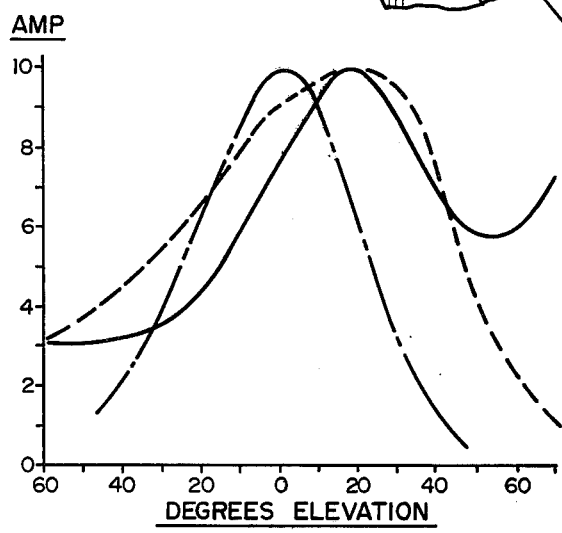
FIGS. 7A, 7B and 7C show a series of waveforms of the vertical pattern obtained with the dual counterpoise antenna of the present invention.
Figure 7B:
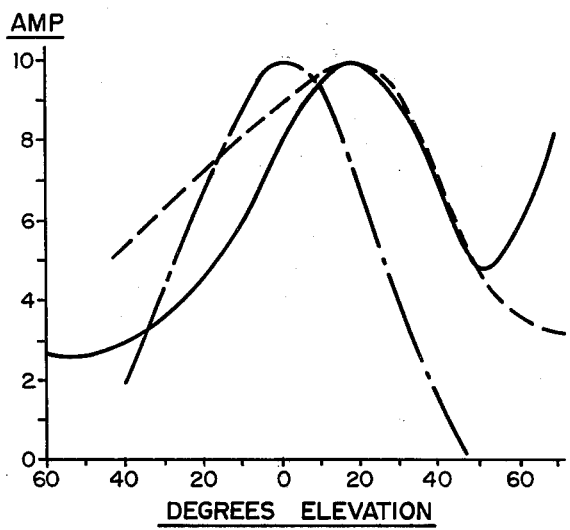
Figure 7C:
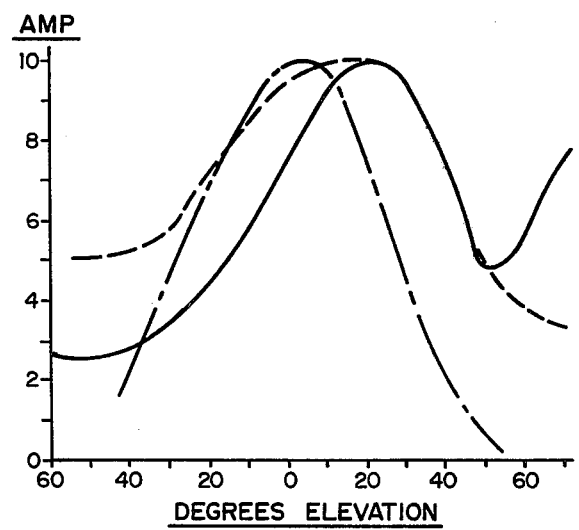

Referring to the waveforms of FIGS. 7A–7C, there is shown the vertical patterns obtained from a typical antenna system of the present invention at various operating frequencies. The curves of FIG. 7A show the verticalpattern of radiated energy at 1160 MHz. The curves of FIG. 7B show a radiation pattern of an antenna of the present invention at 1190 MHz and the curves of FIG. 7C show the vertical pattern at 1210 MHz. In each of these figures, the dashed curve represents the 15 Hz modulation of the energy from the central radiator 10. The dot-dash curve represents the 135 Hz modulation, and the continuous line curve represents the combination of energy radiated from the central radiator 10. These curves plot amplitude of the radiated energy versus vertical angle in degrees.

The vertical radiation patterns of FIGS. 7A–7C for the different energizing frequencies all show a signal intensity peak at about 15° above the horizon and a rapidly decreasing radiation energy pattern at the zero degree elevation. It is the intensity characteristics in the immediate vicinity of the horizon that is most critical. A decrease in the intensity of the signals at angles below the horizon is accomplished by the design of the reflector elements and further the design and positioning of the counterpoise systems. It should be noted that most interrogating aircraft are in the area between an angle of 0° and 20° above the horizon.

While only one embodiment of the invention, together with modifications thereof, has been described in detail herein and shown in the accompanying drawings, it will be evident that various further modifications are possible without departing from the scope of the invention.

What is claimed is:

1. An antenna system for radiating energy above the horizon and energized from a radio frequency source, comprising in combination:
    a central radiator coupled to the radio frequency source, a first plurality of spaced, reflector elements radially positioned from said central radiator, a second plurality of spaced, reflector elements positioned between said central radiator and said first plurality of reflector elements, a first counterpoise system disposed around said central radiator for upwardly reflecting radiation from said central radiator, and a second counterpoise system axially displaced from said first counterpoise system for providing added uplift to radiated signals and decreasing the total energy radiated below the horizon, said second counterpoise system comprising an upper reflecting surface, and a lower reflecting surface mounted parallel to and electrically interconnected with said upper reflecting surface.

2. An antenna system for radiating energy above the horizon as set forth in claim 1 wherein said upper and lower reflecting surfaces are planar metal discs.

3. An antenna system for radiating energy above the horizon as set forth in claim 2 including a shortened cylinder interconnecting said planar metal discs.

4. An antenna system for radiating energy above the horizon as set forth in claim 1 wherein said first counterpoise comprises:

a first stationary reflecting surface axially disposed at one end of said central radiator and extending radially therefrom, and a second rotatable reflecting surface disposed beneath said first reflecting surface and separated therefrom.

5. An antenna system for radiating energy above the horizon as set forth in claim 4 including:

a disc of nonradiating material having a top and bottom surface carried on said rotatable reflecting surface oriented generally perpendicular to the longitudinal axis of said central radiator, and wherein said first plurality of spaced reflector elements includes a first section disposed to extend over the disc top surface, a lower section disposed to extend over the disc bottom surface and an intermediate section joining the upper and lower sections.

6. An antenna system for radiating energy above the horizon as set forth in claim 5 including means for rotating said second reflecting surface and said disc and said second plurality of reflector elements about said central radiator.

7. An antenna system for radiating energy above the horizon as set forth in claim 5 wherein each of said first plurality of reflector elements comprises nine groups equally spaced circumferentially around said disc.

8. An antenna system for radiating energy above the horizon as set forth in claim 3, wherein said upper and lower reflecting surfaces and said cylinder form a donut-shaped configuration coaxial with the longitudinal axis of said central radiator.

9. An antenna system for radiating energy above the horizon as set forth in claim 3, wherein said upper and lower reflecting surfaces in combination with said cylinder establish a signal conduction path of an electrical length that approaches 180°, such that a signal radiating off the outer edge of said lower reflecting surface is substantially out of phase with a signal radiating off the outer edge of said upper reflecting surface.

10. An antenna system for radiating energy above the horizon and energized from a radio frequency source, comprising in combination:

a housing including a drive motor, a central radiator mounted to said housing to be fixed in position with respect thereto and coupled to the radio frequency source, a first plurality of spaced, reflector elements radially positioned from said central radiator, a second plurality of spaced, reflector elements positioned between said central radiator and said first plurality of reflector elements, support means for positioning said first and second plurality of reflector elements and coupled to the drive motor of said housing and rotated thereby to provide rotation of said reflectors around a central radiator for modulating the electromagnetic waves radiated therefrom, a first reflecting surface disposed at one end of said central radiator, a second reflecting surface mounted to said support means and disposed from said first reflecting surface and coupled thereto as a counterpoise for reflecting an upward radiation pattern from said central radiator, a third reflecting surface axially disposed from said first plurality of reflector elements, and a fourth reflecting surface positioned between said first plurality of reflector elements and said third reflecting surface and coupled thereto as a counterpoise for reflecting an upward radiation pattern from the antenna system.

11. An antenna system for radiating energy above the horizon as set forth in claim 10 wherein said first and second reflecting surfaces are planar metal discs.

12. An antenna system for radiating energy above the horizon as set forth in claim 11 wherein said planar metal discs are parallel displaced.

13. An antenna system for radiating energy above the horizon as set forth in claim 10 wherein said third and fourth reflecting surfaces are planar metal discs.

14. An antenna system for radiating energy above the horizon as set forth in claim 13 including a shortened cylinder for interconnecting said planar metal disc of the third and fourth reflecting surfaces.

15. An antenna system for radiating energy above the horizon as set forth in claim 10 wherein said support means includes a disc of nonradiating material having a top and bottom surface oriented generally perpendicular to the longitudinal axis of said central radiator, and said first plurality of reflector elements includes a first section disposed to extend over the disc top surface, a lower section disposed to extend over the disc bottom surface and an intermediate section joining the upper and lower sections.

16. An antenna system for radiating energy above the horizon as set forth in claim 15 wherein each of said first plurality of reflector elements comprises nine groups equally spaced circumferentially around said disc.

* * * * *